United States Patent [19]

Krug

[11] Patent Number: 5,460,854
[45] Date of Patent: Oct. 24, 1995

[54] IMPREGNATED CERAMIC CORE AND METHOD OF MAKING SAME

[75] Inventor: Eugene Krug, Oakhurst, N.J.

[73] Assignee: Certech Incorporated, Wood Ridge, N.J.

[21] Appl. No.: 821,641

[22] Filed: Jan. 16, 1992

[51] Int. Cl.⁶ .............................. B05D 3/02; B05D 1/18; B05D 3/08
[52] U.S. Cl. .................. 427/393.6; 427/384; 427/430.1; 427/223; 427/314; 501/80
[58] Field of Search ............................ 427/384, 393.6, 427/430.1, 223, 314; 521/80

[56] References Cited

U.S. PATENT DOCUMENTS

| | | | |
|---|---|---|---|
| 3,769,044 | 10/1973 | Horton | 106/38.3 |
| 3,808,012 | 4/1974 | Bailey et al. | 106/44 |
| 3,852,085 | 12/1974 | Vurlicer. | |
| 3,852,100 | 12/1974 | Argabright et al. | |
| 3,859,405 | 1/1975 | Horton | 264/49 |
| 4,130,157 | 12/1978 | Miller et al. | 164/132 |
| 4,284,121 | 8/1981 | Horton | 164/520 |
| 4,289,803 | 9/1981 | Wales et al. | 427/134 |
| 4,530,722 | 7/1985 | Moore et al. | 106/38.35 |
| 4,533,394 | 8/1985 | Watts | 106/38.2 |
| 4,602,667 | 7/1986 | Moore et al. | 164/7.1 |
| 4,664,761 | 5/1987 | Zupancic et al. | 204/129 |
| 4,664,948 | 5/1987 | Moore et al. | 427/134 |
| 4,689,081 | 8/1987 | Watts | 106/38.4 |
| 4,921,038 | 5/1990 | Sasaki et al. | |
| 4,939,191 | 7/1990 | Kataoka et al. | |
| 4,996,175 | 2/1991 | Sturgis. | |

FOREIGN PATENT DOCUMENTS

| | | |
|---|---|---|
| 0296981 | 6/1988 | European Pat. Off. . |
| 1128816 | 10/1968 | United Kingdom . |
| 1337705 | 11/1973 | United Kingdom . |

*Primary Examiner*—Anthony McFarlane
*Assistant Examiner*—Nhat D. Phan
*Attorney, Agent, or Firm*—Amster, Rothstein & Ebenstein

[57] ABSTRACT

A method of strengthening a fired porous ceramic core for use in investment casting includes the steps of providing a fired porous ceramic core, impregnating the core with an aqueous solution of a water-soluble gum, resin, or sugar, such as polyvinyl alcohol, and drying the impregnated core to remove the water.

12 Claims, 2 Drawing Sheets

IMPREGNATED CERAMIC CORE AND METHOD OF MAKING SAME

BACKGROUND OF THE INVENTION

The present invention relates to an impregnated ceramic core suitable for use in investment casting and a method of impregnating the fired porous ceramic core to strengthen the same.

Ceramic cores suitable for use in investment casting may be made by an injection-molding process. A mixture of ceramic particles and a binder material (such as wax) is prepared and formed into the desired ceramic object (here, the porous core). The formed core is then fired, sometimes in one firing operation, but commonly in two firing operations, a low-temperature firing (at about 250° F.) and a high-temperature firing (at about 1600° F. or higher). The low-temperature firing removes from the core a major portion of the binder material which, depending upon its composition, either sublimes or melts and flows away. The purpose of the low-temperature firing is to remove the bulk of the binder material so that there is less dimensional change during the high-temperature firing. The high-temperature firing is performed at a temperature sufficiently high to sinter and therefore harden the ceramic particles, removing any remnants of the binder material which were not removed during the low-temperature firing. After the high-temperature firing, the porous ceramic core is cooled, inspected and optionally cleaned. It is then ready to be forwarded to the investment caster at a foundry for use in investment casting.

However, the ceramic cores thus produced are intrinsically brittle and of relatively high porosity (20–45%); accordingly, they exhibit a low modulus of rupture (M.O.R.) or flexural strength. For investment casting, both the flexural strength and the degree of interconnective porosity must be carefully engineered. For example, during the wax-injection stage of the investment casting process, the core must maintain structural integrity. However, the combination of high porosity, complex shape (e.g., as required for airfoils) and possibly extremely thin cross sections (on the order of a few mils) tend to render the cores susceptible to distortion and/or fracture. On the other hand, if the strength of the core is too great during the metal-solidification stage, a defect commonly known as "hot tearing" will result.

Thus, in order to impart structural integrity to the core for the wax-injection step, while still maintaining the desired engineering properties during the casting (metal-solidification) step, the core is often impregnated with a thermoset resin/binder and then heat cured (e.g., at 250°–400° F.) to impart strength to the porous ceramic core during handling, shipping and, ultimately, the initial stages of investment casting (i.e., the wax-injection step). Since the core manufacturer and the investment caster are typically found in different locations, en important function of the resin/binder system is to afford sufficient strength to the porous ceramic core to enable it to be handled and shipped from the core manufacturer to the investment caster at the foundry. The impregnation agent is typically a wax, such as caranuaba, or a phenolic resin to impart strength to the core. After the wax-injection step, the resin/binder is typically pyrolyzed in order to reestablish the core's intrinsic physical properties and, in particular, the strength and porosity required for the subsequent processing stages (that is, the casting and chemical leaching steps).

In the investment-casting process, the ceramic core is frequently required to maintain close dimensional tolerances which, depending on the particular core geometry and the intended application, may be on the order of a few mils (e.g., 0.01–0.02 inches). Conventional resin/binder-treated cores exhibit a high degree of core distortion (e.g., 10–20 mils equivalent to 0.2–0.5 millimeters) which frequently exceeds the dimensional tolerances and thus requires rejection of the core. While the exact cause of this distortion is not known with great particularity, it is believed to be related to the curing mechanism used to cure the resin/binder system and/or the interactions between the core material and the resin/binder material. However, regardless of the exact mechanism causing such distortion, clearly this distortion must be held to a minimum.

The conventional resin/binder systems have not proven to be entirely satisfactory in use. Typically, the resin/binder system utilized presents disadvantages in terms of the low level of additional strength afforded to the core, the requirement for curing of the resin/binder after impregnation with its resultant distortion of the core, various industrial safety and environmental concerns (e.g., toxicity) and cost.

Accordingly, it is an object of the present invention to provide a method of greatly enhancing the strength of fired ceramic cores while at the same time maintaining stringent dimensional tolerances.

Another object is to provide such a method which does not require a curing step.

A further object is to provide such a method which eliminates various industrial safety and environmental concerns and is characterized by a low cost.

SUMMARY OF THE INVENTION

The above and related objects of the present invention are obtained in a method of strengthening a fired porous ceramic core for use in investment casting. The method comprises the steps of providing a fixed porous ceramic core, impregnating the core with an aqueous solution of a strengthening agent which is a water-soluble gum, resin, sugar or combination thereof, and drying the impregnated core to remove the water.

Preferably the gum or resin is selected from the group consisting of alginates, alkyl and hydroxyalkylalkylcellulose, carboxy-methylcellulose, carrageenan, guar gum, gum agar, gum arabic, gum ghatti, gum karaya, gum tragacanth, hydroxyethylcellulose, hydroxypropylcellulose, locust bean gum, pectins, polyacrylamide, poly(acrylic acid) and its homologs, polyethylene glycol, poly(ethylene oxide), polyvinyl alcohol, polyvinylpyrrolidone, starch and its modifications, tamarind gum, xanthan gum, and combinations thereof.

In a preferred embodiment, the aqueous solution includes polyvinyl alcohol. The solution is dilute, at least 2.1% by weight, and optimally 2.1–10% by weight. The solution is applied to the core for about 5 minutes to impregnate the core, typically by soaking the core therein.

The present invention also encompasses a fired porous ceramic core, and a water-soluble strengthening agent impregnated into the pores of the core to strengthen the same. The strengthened core is characterized by a substantially enhanced flexural strength relative to the core without the strengthening agent.

Preferably the strengthening agent is polyvinyl alcohol and comprises on a weight basis at least 0.25% of the core.

The core is characterized by a low level of dimensional distortion upon drying of the core containing the strengthening agent.

DETAILED DESCRIPTION OF THE PREFERRED EMBODIMENTS

Figure 1:
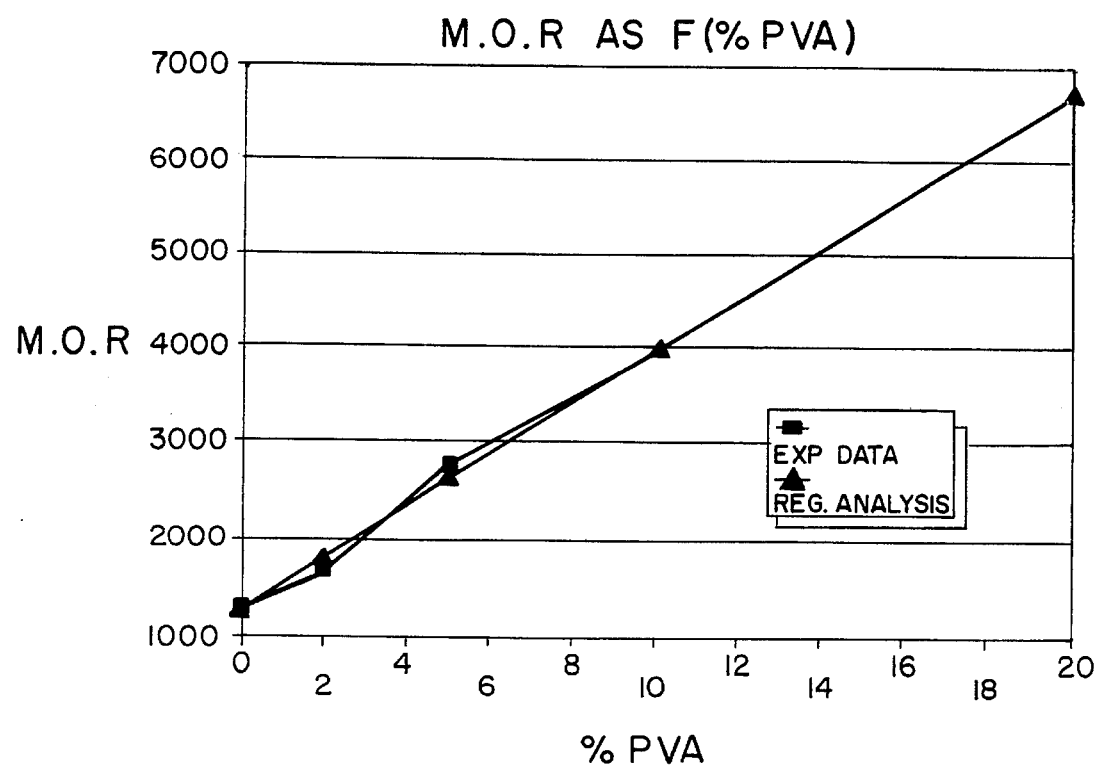
FIG. 1 represents M.O.R. results for test bars treated with 0, 2, 5, and 10% PVA solutions.

According to the present invention, the conventional resin/binder systems used for strengthening fired ceramic cores are replaced by a water-soluble gum, resin, sugar or combination thereof. The water-soluble gums and resins suitable for use in the present invention are alginates, alkyl and hydroxyalkylalkylcellulose, carboxymethylcellulose, carrageenan, guar gum, gum agar, gum arabic, gum ghatti, gum karaya, gum tragacanth, hydroxyethylcellulose, hydroxypropylcellulose, locust bean gum, pectins, polyacrylamide, poly(acrylic acid) and its homologs, polyethylene glycol, poly(ethylene oxide), polyvinyl alcohol, polyvinylpyrrolidone, starch and its modifications, tamarind gum, xanthan gum, and combinations thereof. These materials are described with more particularity in the *Handbook Water-Soluble Gums and Resins* by Robert Davidson (McGraw Hill 1980). These materials and the water-soluble sugars afford a high strength-to-weight ratio and adhere strongly to ceramic surfaces. The preferred impregnating material for use in the present invention is an aqueous solution of polyvinyl alcohol (PVA).

The water-soluble nature of these materials affords ease of handling and avoids the industrial safety and environmental concerns which typically characterize the conventional nonaqueous impregnating agents typically using highly toxic solvents. As the water employed as the solvent in the present invention is easily removed from the core, there is no need for any curing step. Furthermore, the impregnating agents of the present invention are relatively abundant and inexpensive. They may be used to strengthen complexly shaped ceramic cores (e.g., ceramic cores used to create air foils) since their use results in only minimal dimensional distortion as no curing thereof is required.

Preferably the impregnating agent is a dilute aqueous solution containing at least 2.1% by weight of the water-soluble gum resin, or sugar (e.g., PVA), and optimally 2.1–10% by weight. A solution of 3% or higher is especially preferred. The higher the percentage of the impregnating agent in the solution, the greater the improvement in structural strength. The solutions exhibit a viscosity and wetting behavior which is conducive to impregnation of the porous ceramic material. Solution concentrations in excess of 10% should be avoided, however, due to their high viscosity, which limits the wetting behavior of the solution. Subject to this upper limit, the relationship between flexural strength and PVA concentration is nearly linear, with the strength of the untreated ceramic core being increased almost threefold by using a 10% PVA solution.

The improvement in flexural strength resulting from the substitution of the materials of the present invention for the conventional resin/binder materials is significant. Whereas unimpregnated control pieces had a flexural strength (M.O.R.) of 2207 (±197) psi, and the same pieces treated with a conventional phenolic resin material had a flexural strength of 3310 (±812) psi, the same pieces treated with 10% PVA according to the present invention exhibited a significantly higher flexural strength of 4670 (±531) psi. Thus, whereas the conventional phenolic resin impregnation resulted in an improvement of 50% in flexural strength, the PVA treatment according to the present invention resulted in an improvement of 112%.

Equally important, the treatment of the present invention results in negligible distortion of the core. For example, whereas impregnation with a conventional phenolic resin system may result in distortions of a few tenths of a millimeter during curing, there is a negligible distortion of only a few hundredths of a millimeter between the dimensions prior to impregnation and subsequent to impregnation and drying according to the present invention.

The impregnating agent of the present invention may be applied to the core by any of the techniques conventionally used in the art for applying and impregnating the agent to the core, for example, by soaking, dipping, or the like. While typically soaking the core in the PVA solution once is sufficient, the soaking could be repeated one or more times to further fill the pores of the core with additional impregnation material according to the present invention. As a general matter, it has been found that a single soak of a few minutes (preferably about five minutes) -is sufficient to achieve the advantages of the present invention, although even a very brief soak of less than a minute also produces advantageous results. A dried impregnated core according to the present invention contains at least 0.25%, and preferably 0.25 to 1.3% by weight, of the strengthening agent, depending on the concentration of the solution used.

EXAMPLE 1

The objective of this experiment was to establish the relationship between PVA concentration and the resultant increase in core strength.

Three PVA aqueous solutions were prepared consisting of 2, 5 and 10 weight percent PVA. These solutions were utilized to treat ceramic core test (M.O.R.) bar samples.

The PVA treatment consisted of immersion of test bars in the respective PVA solutions for a fixed period of time (five minutes). After impregnation, the test bars were cleansed of excess solution, using a water bath. The rinsed test bars were subsequently dried to remove excess water. After drying, the M.O.R. was measured using a three point bend fixture. For comparison, the M.O.R. of a control group of test bars (0% PVA) was also measured.

The M.O.R. results for the test bars treated with the 0, 2, 5 and 10% PVA solutions are presented in FIG. 1. The M.O.R. for the control group was 1310 (±32)p.s.i. The M.O.R. of the test bars treated with 2, 5 and 10% PVA solutions increased to 1682 (±46), 2762 (±226), and 3690 (±165) p.s.i., respectively. Also presented in FIG. 1 are the data points obtained by regression analysis, including an extrapolation for a 20% PVA solution. These results show: (1) there was a nearly linear relationshp between the M.O.R. and PVA concentration and (2) the strength of the ceramic core can be increased almost threefold using the 10% PVA solution.

EXAMPLE 2

The objective of this experiment was to determine the relative increase in flexural strength provided by conventional phenolic resin treatment and a treatment according to the present invention.

In a similar set of experiments to Example 1, the M.O.R. of test bars treated with 10% PVA solution were compared with test bars treated with a conventional thermosetting phenolic resin based system. In this case, the control group (i.e., the unimpregnated test bars) had a slightly higher average M.O.R. 2207 (±197) p.s.i. Test bars treated with the conventional phenolic resin material had an increased M.O.R. of 3310 (±812) p.s.i. However, test bars treated with 10% PVA exhibited a significantly higher M.O.R. of 4670 (±531) p.s.i. The results show that treatment with 10% PVA provided a M.O.R. over 40% higher than the M.O.R. obtained by treatment with the conventional phenolic resin system.

EXAMPLE 3

The objective of this experiment was to determine the dimensional stability of ceramic-cores impregnated with a 10% PVA solution.

Figure 2:
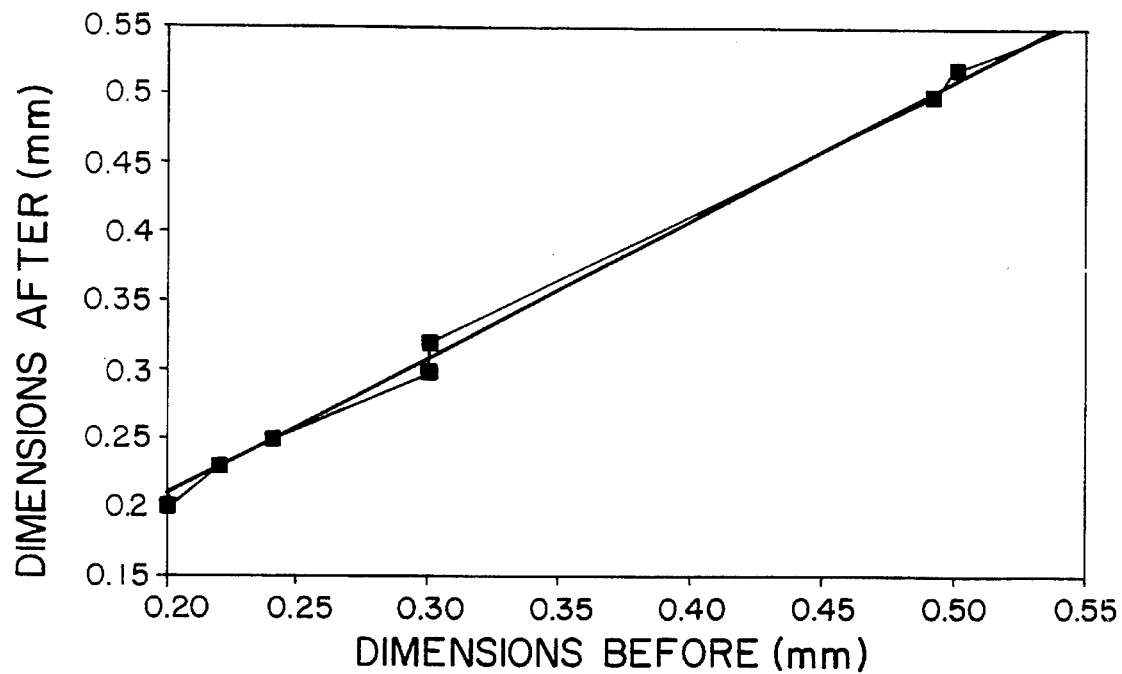
FIG. 2 shows dimensions of a ceramic core before and after PVA impregnation.

Representative complex shape airfoil ceramic cores were: (1) labeled, (2) laser gauged for critical dimensions, (3) impregnated with 10% PVA and dried to remove the water, and (4) laser gauged again to establish the resultant degree of distortion. The results of the laser gauge readings (in millimeters) for both before (x-axis) and after (y-axis) PVA treatment are provided in FIG. 2.

These results show that there was virtually no distortion of the airfoil core as a result of the PVA treatment. As a point of reference, the distortion encountered using a conventional phenolic resin system is high—on the other of a few tenths of a millimeter (10 to 20 mils)—and often unacceptable. Thus, the system according to the present invention exhibits the unique ability to impart superior M.O.R. with negligible distortion.

To summarize, the present invention provides a method of greatly enhancing the strength of firing ceramics cores while at the same time maintaining stringent conventional tolerances because no curing step is required. The method illuminates various industrial safety and environmental concerns as characterized by low cost.

Now that the preferred embodiments of the present invention have been described in detail, various modifications and improvements thereon will become readily apparent to those skilled in the art. Accordingly, the spirit and scope of the present invention is to be construed broadly and limited only by the appended claims, not by the foregoing specification.

I claim:

1. A method of strengthening a fired porous ceramic core for use in investment casting, comprising the steps of:
    (A) providing a fired porous ceramic core consisting essentially of sintered ceramic particles;
    (B) impregnating the core with an aqueous solution of a water-soluble starch, gum, resin, sugar or combination thereof; and
    (C) drying the impregnated core to remove the water.

2. The method of claim 1 wherein the water-soluble starch, gum or resin selected from the group consisting of alginates, alkyl and hydroxyalkyl cellulose, carboxymethylcellulose, carrageenan, guar gum, gum agar, gum arabic, gum ghatti, gum karaya, gum tragacanth, locust bean gum, pectins, polyacrylamide, poly(acrylic acid) and its homologs, polyethylene glycol, poly(ethylene oxide), polyvinyl alcohol, polyvinylpyrrolidone, starch and starch modified to alter its molecular weight, tamarind gum, xanthan gum, and combinations thereof.

3. The method of claim 2 wherein the aqueous solution is a polyvinyl alcohol solution.

4. The method of claim 1 wherein the solution is less than 10% by weight of the water-soluble starch, gum, resin or sugar.

5. The method of claim 4 wherein the solution is at least 2.1% by weight of the water-soluble starch gum, resin or sugar.

6. The method of claim 5 wherein the solution is 2.1–10% by weight of the water-soluble starch gum, resin or sugar.

7. The method of claim 1 wherein the solution is applied to the core for about 5 minutes to impregnate the core.

8. The method of claim 1 wherein the solution is applied to core by soaking the core therein.

9. The method of claim 1 wherein the dried core contains at least 0.25% by weight of the water-soluble starch, gum, resin or sugar.

10. The method of claim 1 wherein the dried core contains at least 0.25% by weight of polyvinyl alcohol.

11. A method of strengthening a fired porous ceramic core for use in investment casting, comprising the steps of:
    (A) providing a fired porous ceramic core consisting essentially of sintered ceramic particles;
    (B) impregnating the core with an aqueous solution of a water-soluble starch, gum, resin, sugar or combination thereof selected from the group consisting of alginates, alkyl and hydroxyalkycellulose, carboxymethylcellulose, carrageenan, guar gum, gum agar, gum arabic, gum ghatti, gum karaya, gum tragacanth, locust bean gum, pectins, polyacrylamide, poly(acrylic acid) and its homologs, polyethylene glycol, starch and starch modified to alter its molecular weight, tamarind gum, xanthan gum, and combinations thereof by soaking the core therein; and
    (C) drying the impregnated core to remove the water.

12. The method of claim 3 wherein the aqueous solution is a 2.1–10% solution by weight of polyvinyl alcohol.

* * * * *